United States Patent [19]

Fague

[11] Patent Number: 5,512,865
[45] Date of Patent: Apr. 30, 1996

[54] DIGITAL OVERSAMPLED QUADRATURE MODULATOR

[75] Inventor: Daniel E. Fague, Sunnyvale, Calif.

[73] Assignee: National Semiconductor Corporation, Santa Clara, Calif.

[21] Appl. No.: 436,669

[22] Filed: May 8, 1995

[51] Int. Cl.$^6$ .................................................. H04L 27/20
[52] U.S. Cl. ........................ 332/103; 332/104; 375/283; 375/308
[58] Field of Search .................................... 332/103, 104, 332/105; 375/279, 280, 281, 283, 261, 298, 308

[56] References Cited

U.S. PATENT DOCUMENTS

| | | | |
|---|---|---|---|
| 4,213,094 | 7/1980 | Wood | 332/104 |
| 5,379,242 | 1/1995 | Rose et al. | 364/724.01 |

OTHER PUBLICATIONS

"Personal Handy Phone System," RCR Standard, Version 1, RCR STD–28, Dec. 20, 1993, pp. 29–31.
Bjorn Bjerede et al., "An Intermediate Frequency Modulator using Direct Digital Synthesis Techniques for Japanese Personal Handy Phone (PHP) and Digital European Cordless Telecommunications (DECT)", pp. 467–471. IEEE Vehicular Technology Conference, Stockholm, Sweden Jun. 1994.
Yoshihiko Akaiwa, "Digital Modulation/Demodulation Techniques for Mobile Radio Communications in Japan," IEICE Transactions, vol. E 74, No. 6 Jun. 1991, pp. 1503–1511.
Dr. Kamilo Feher, Ph.D., "Bandlimited Baseband Systems," Digital Communications Satellite/Earth Station Engineering, 1983 by Prentice–Hall Inc. Englewood Cliffs, NJ 07632, pp. 91–115, 162–174, 200–201.
LMX2411 Baseband Processor For Radio Communications, National Semiconductor Corporation, Sep. 1993, pp. 1–8.
LMX2410 Baseband Processor for Radio Communications, National Semiconductor Corporation, Mar. 1993, pp. 1–16.

*Primary Examiner*—Siegfried H. Grimm
*Attorney, Agent, or Firm*—Skjerven, Morrill, MacPherson, Franklin & Friel

[57] ABSTRACT

The preferred embodiment modem is an all hardware modulator which receives as its input two baseband drive signals, I and Q, which can come from a ROM filter or any other digital filter. Instead of storing modem responses in a ROM, multiplexers for the I and Q channels are used in combination with a control circuit to essentially perform as sine/cosine modulators for the baseband signal. The inputs into the I channel multiplexer include a non-inverted I signal, an inverted I signal, and a mid-value signal. The Q channel multiplexer has applied to it a non-inverted Q signal, an inverted Q signal, and a mid-value Q signal. Two-bit counters are applied to the control terminals of the I and Q multiplexers, where the 2-bit counters are clocked by a sample frequency. In one embodiment, the sample frequency is chosen to be four times the carrier frequency. The counter for the Q channel begins one count behind the I channel counter, thus giving a 90° phase shift for the Q channel. The outputs of the two multiplexers are added to provide the output of the digital modem. The resulting word is then applied to a digital-to-analog converter and subsequently up-converted, filtered, and amplified for transmission.

20 Claims, 4 Drawing Sheets

DIGITAL OVERSAMPLED QUADRATURE MODULATOR

FIELD OF THE INVENTION

This invention relates to communication systems, and, in particular, to a quadrature phase shift keying (QPSK) system.

BACKGROUND OF THE INVENTION

Quadriphase systems using QPSK are commonly used because of their simplicity, efficient operation, resulting narrow bandwidth, and noise tolerance. In a basic QPSK system, the resulting modulated signal has four distinct phase states. These phase states are conveyed by di-bits, each di-bit being typically formed of an I bit and a Q bit.

FIG. 1 illustrates an input data stream 10 in a non-return-to-zero (NRZ) format. In a basic QPSK system without differential encoding, this NRZ data stream is converted using well known techniques into an I data stream 12 and a Q data stream 14, with the resulting di-bit symbol rate equal to half that of the incoming NRZ bit rate. In FIG. 1, the I data is shown being based on only the odd numbered NRZ bits, while the Q data is shown being based on only the even numbered NRZ bits. The I data is generally referred to as being in-phase, and the Q data is referred to as being in quadrature phase. The I and Q data, taken as di-bit symbols, fully convey the information in the NRZ data stream.

FIG. 2 illustrates a differential QPSK system, also referred to as a π/4-DQPSK system, where serial data $a_n$ is converted to $(X_k, Y_k)$ symbols by a serial/parallel converter 18 and then changed to corresponding signals $(I_k, Q_k)$ by a differential encoder 19. The symbol $(X_k, Y_k)$ corresponds to two consecutive serial bits (e.g., $a_n$, $a_n+1$), while conversion from $(X_k, Y_k)$ to $(I_k, Q_k)$ is performed according to equations 1 and 2 below and Table 1.

$$I_k = I_{k-1} \cos [\Delta\Phi(X_k, Y_k)] - A_{k-1} \sin [\Delta\Phi(X_k, Y_k)] \qquad \text{Eq. 1}$$

$$Q_k = I_{k-1} \sin [\Delta\Phi(X_k, Y_k)] + Q_{k-1} \cos [\Delta\Phi(X_k, Y_k)] \qquad \text{Eq. 2}$$

TABLE 1

| $X_k$ | $Y_k$ | $\Delta\phi$ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

The I and Q data is then filtered by Nyquist low pass filters 20 and 21 to remove (or partially remove) inter-symbol interference.

The I data is then multiplied with a cosine wave by multiplier 22. This cosine wave is shifted 90° by shifter 23 to convert the cosine wave to a sine wave, and the Q data is multiplied with this sine wave by multiplier 24. The modulated I and Q data is then summed by an adder 26 to provide the modulated di-bit symbols at an output of the DQPSK modem.

The generation of such modulated I and Q baseband signals is described in the Personal Handy Phone System RCR standard-28, incorporated herein by reference.

This signal may then be up-converted as necessary and filtered by a bandpass filter, then suitably amplified after any additional up-converting for transmission.

FIG. 3 shows a digital modem 32 which may replace the modem of FIG. 2. In FIG. 3, the incoming data stream is combined with an oversampling clock and converted into a parallel address code by a serial-to-parallel converter 34, which may be a shift register. For each new data symbol or clock bit, a different response is addressed in ROM 36 such that the digital output of ROM 36 generally corresponds to the DQPSK output of adder 26 in FIG. 2. Programming such a ROM 36 with the desired response to the incoming data stream is well known. A digital output of ROM 36 is then applied to a digital-to-analog converter 38 to convert the digital signal to an analog signal for subsequent up-conversion, further filtering, and transmission.

Additional details regarding DQPSK modems may be found in the following publications: the paper entitled, "An Intermediate Frequency Modulator Using Direct Digital Synthesis Techniques For Japanese Personal Handy Phone (PHP) And Digital European Cordless Telecommunications (DECT)," by Bjorn Bjerede, et al., pages 467–471, IEEE Vehicular Technology Conference, Stockholm, Sweden, June 1994; the paper entitled "Digital Modulation/Demodulation Techniques For Mobile Radio Communications In Japan," by Y. Akaiwa, pages 1503–1511, IEICE Transactions, Vol. E 74, No. 6, June 1991; and the book entitled *Digital Communications*, by Dr. Kamilo Feher, Chapter 4.7.1, Practice-Hall, 1983. All these publications are incorporated herein by reference.

Digital QPSK modems are desirable since they provide more repeatable modulation accuracies. Such digital modulators may be implemented using the ROM look-up table shown in FIG. 3 or using a software program in combination with a processor for providing real-time conversion rather than addressing the DQPSK response stored in a ROM. Digitally storing a filter response in a ROM for use in a digital DQPSK modem is described in copending application, U.S. Ser. No. 08/436,678, entitled "Equalization Filter Compensating For Distortion In A Surface Acoustic Wave Device," filed May 8, 1995, by Daniel Fugue, Gerard Socci, and Benny Madsen, and in U.S. Pat. No. 5,379,242, entitled "ROM Filter," by Dennis Rose and Daniel Fague, both documents being assigned to the present assignee and incorporated herein by reference.

Although using a ROM to generate the filtered DQPSK digital signal has advantages, the resulting die size is relatively large, especially when the data is oversampled. For example, assume that the various possible modulated signals which can occur are stored in the ROM 36 in FIG. 3, the sampling rate is 9.6 MHz, and the symbol rate of the system is 192 Kbps. The carrier frequency of the cosine and sine waves for modulating the I and Q data is set for 1.152 MHz. To ensure that the modulated signal has continuous transitions, an integer number of cycles of the carrier must be stored in the sine and cosine ROMs, whether or not the ROMs are combined with the baseband filter ROMs. Obtaining an integer number of cycles of the carrier can be assured by the following relationship:

$$N/M = f_{SAMP}/f_{CARRIER}, \qquad \text{Eq.3}$$

where N equals the number of samples of the carrier per symbol, M is the number of complete cycles of the carrier sampled, $f_{SAMP}$ is the sampling frequency, and $f_{CARRIER}$ is the carrier frequency. Given the above assumed values, equation 3 gives an N of 25 and an M of 3 as the minimum integers possible. If the required response values were all stored in a ROM, this would mean that each combination of baseband symbols would require 25 samples. The ROM and its addressing logic would have to be run at the sampling frequency 9.6 MHz, causing a large current consumption. An alternate implementation could be to clock a sine and cosine ROM separately from the baseband filter ROMs and use conventional digital multipliers to do the modulation. However, this still has the disadvantage that the sine and cosine ROMs need 25 samples per symbol each.

What is needed is a new implementation of a digital modem which takes up less real estate and consumes less current than the digital modems described above.

SUMMARY

The preferred embodiment modem is an all hardware modulator which receives as its input two baseband drive signals, I and Q, which can come from a ROM filter or any other digital filter. Instead of storing modem responses in a ROM, multiplexers for the I and Q channels are used in combination with a control circuit to essentially perform as sine/cosine modulators.

The inputs into the I channel multiplexer include a non-inverted I signal, an inverted I signal, and a mid-value signal. For a 5-bit I signal, the mid-value signal would be 16. The Q channel multiplexer has applied to it a non-inverted Q signal, an inverted Q signal, and a mid-value Q signal.

Two-bit counters are applied to the control terminals of the I and Q multiplexers, where the 2-bit counters are clocked by a sample frequency. In one embodiment, the sample frequency is chosen to be four times the carrier frequency. The counter for the Q channel begins one count behind the I channel counter, thus giving a 90° phase shift for the Q channel.

The 2-bit counters in conjunction with the multiplexers effectively act as a multiplier of the baseband signal. When the counter value indicates the sine (or cosine) wave should be 1, the non-inverted baseband data is passed through the multiplexer. When the counter value indicates the sine (or cosine) wave should be -1, the inverted baseband data is passed through the multiplexer. When the counter value indicates the sine (or cosine) wave should be 0, the mid-value is passed through the multiplexer, effectively causing a zero value to be passed when unsigned integers are used.

The outputs of the two multiplexers are added to provide the output of the digital modem.

The resulting word is then applied to a digital-to-analog converter and subsequently up-converted, filtered, and amplified for transmission.

Assuming a sampling frequency of 9.6 MHz and a carrier frequency of 2.4 MHz, the number of samples of the carrier per symbol using the invention is reduced from 25 samples of the modulated sine and cosine signals (50 samples total) to only four samples total. In addition, the invention removes the need for separate sine and cosine ROMs and large multipliers. Further, any baseband ROM filter can run at a lower clock rate, thus reducing current consumption.

The preferred embodiment may be implemented using much less real estate than digital modems using conventional techniques.

DETAILED DESCRIPTION OF THE PREFERRED EMBODIMENTS

Figure 4:
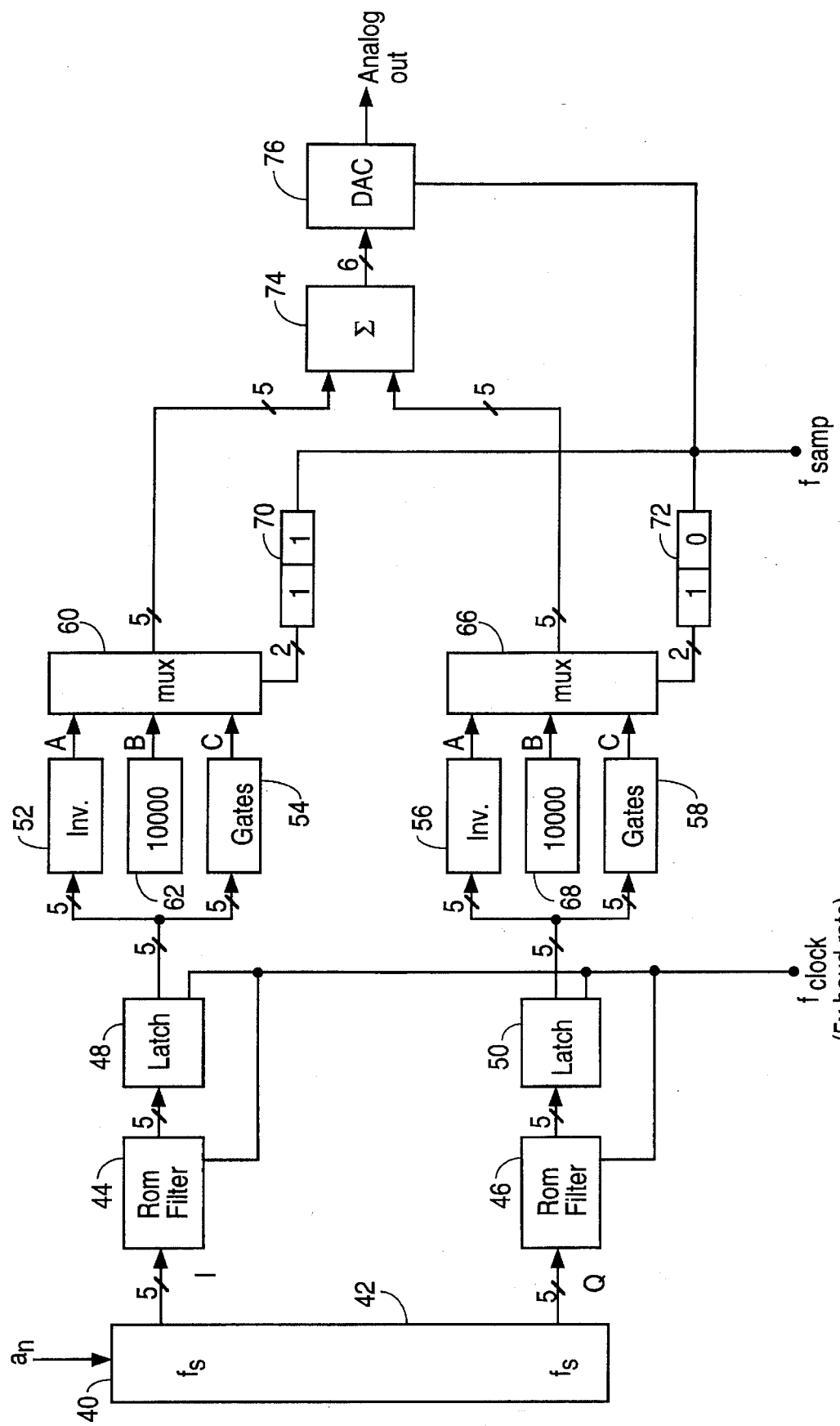
FIG. 4 is a functional diagram of the preferred embodiment of the invention.

FIG. 4 is a functional diagram of a digital modulator in accordance with the preferred embodiment of the invention. The modulator of FIG. 4 is a DQPSK modulator using differential encoding, also referred to as a π/4-DQPSK modulator.

Figure 1:
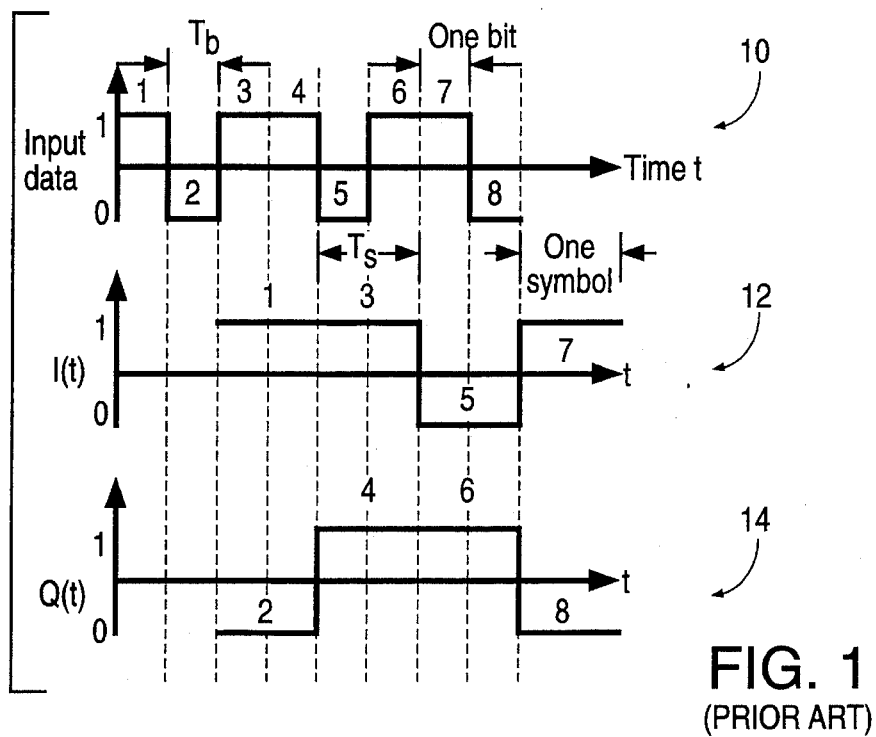
FIG. 1 illustrates derived I and Q data from an NRZ data stream.
Figure 2:
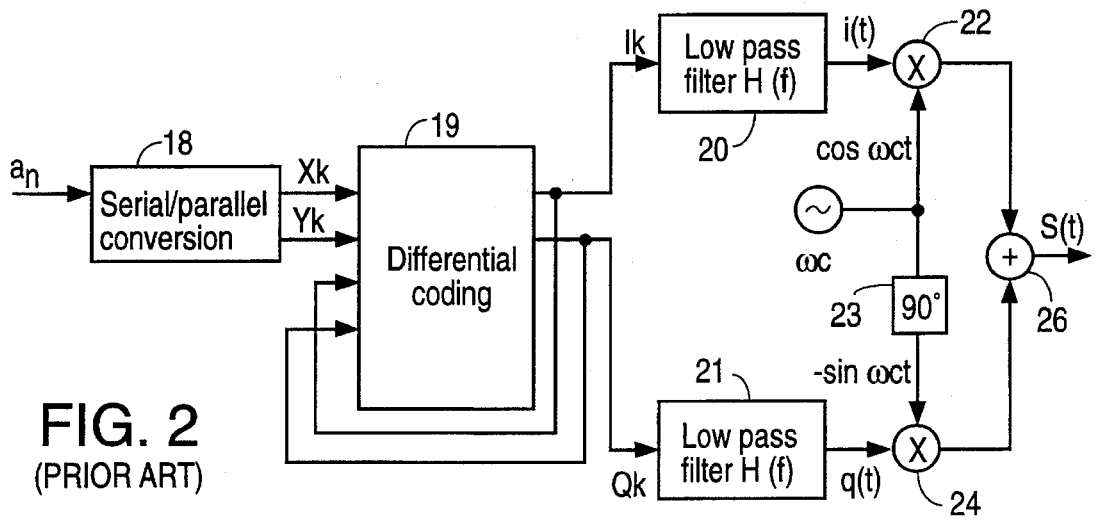
FIG. 2 is a simplified embodiment of an analog DQPSK system.

Conventional serial data $a_n$, such as in a NRZ format, is applied to an input 40 of converter 42. Converter 42 performs serial/parallel conversion and differential encoding of the NRZ data to convert the NRZ data into I and Q data, such as illustrated in FIG. 2. The construction and operation of converter 42 may be conventional and would be already understood by those skilled in the art. The I and Q data are clocked out of converter 42 at the symbol baud rate $f_s$ of, for example, 100K baud/second. In the preferred embodiment, each I and Q symbol is a 5-bit word, but any word length may be used depending on the requirements of the system.

The I data is applied to a ROM filter 44, while the Q data is applied to a ROM filter 46. Filters 44 and 46 are identical and perform low pass (Nyquist) filtering for removing (or partially removing) inter-symbol interference as well as perform equalization to compensate for signal distortion subsequently introduced by, for example, a surface acoustic wave (SAW) filter located downstream in the analog portion of the system. Performing any equalization with ROM filters 44 and 46 is optional and described in copending application U.S. Ser. No. 08/436,678, entitled "Equalization Filter Compensating For Distortion In A Surface Acoustic Wave Device," assigned to the present assignee and incorporated herein by reference. Creation of the coefficients in ROM filters 44 and 46 to perform low pass filtering are well known and will not be described in detail.

ROM filters 44 and 46 include an address buffer which uses the I or Q bits to create a parallel address code for addressing locations in the ROM filter 44 or 46. The addressed location provides a filter output response to the particular I or Q bits. A preferred ROM filter construction is described in U.S. Pat. No. 5,379,242, entitled "ROM Filter," assigned to the present assignee and incorporated herein by reference.

In the preferred embodiment, the output of ROM filters 44 and 46 is a 5-bit word. The word length, however, can be any number of bits, depending on the requirements of the system. The look-up values in ROM filters 44 and 46 are made available for five samples per symbol, thus allowing five clock cycles of $f_{clock}$ for the complete filter response. The frequency $f_{clock}$, however, can be made any multiple of the symbol baud rate, depending on the requirements of the system.

The 5-bit word responses output from ROM filters 4 and 46 are temporarily stored in latches 48 and 50 during each clock cycle, providing five samples per symbol. Latches 48 and 50, or their equivalent, may actually be part of ROM filters 44 and 46, respectively. Depending on the particular implementation of the system, latches 48 and 50 may even be deleted if their function is not needed.

The output of the I channel latch 48 is provided to a bank of inverters 52, one inverter per bit, and to a bank of non-inverting transmission gates 54. The output of Q channel latch 50 is provided to a bank of inverters 56, one inverter per bit, and to a bank of non-inverting transmission gates 58.

The output of inverters 52 is connected to a first input, A, of multiplexer 60; the output of gates 54 is connected to a second input, C, of multiplexer 60; and a digital value equal to the mid-value between the minimum and maximum I values is provided at a third input, B, of multiplexer 60. In the case of a 5-bit word, the mid-value is 16, and its binary value 10000 is provided by a register 62 or hard-wired. The output of inverters 52 is effectively the multiplication of the filtered word by −1; the output of gates 54 is effectively the multiplication of the digital word by 1; and the output of register 62 is effectively the multiplication of the digital word by 0, assuming unsigned integers are used.

Similarly, the output of the Q channel inverters 56 is applied to a first input, A, of multiplexer 66; the output of gates 58 is applied to a second input, C, of multiplexer 66; and a mid-value (i.e., 16) contained in register 68 is applied to a third input, B, of multiplexer 66.

Each of multiplexers 60 and 66 is controlled by binary values on two input lines in the preferred embodiment. A 2-bit counter 70 provides the control signals for multiplexer 60, while a 2-bit counter 72 provides the control signals for multiplexer 66. The counters 70 and 72 are clocked at a sampling frequency $f_{samp}$, which, in the preferred embodiment, is chosen to be four times the carrier frequency $f_{carrier}$. Such a sample frequency may be the highest sample rate in the system or an integer divide (e.g., divide by two) from the highest sample rate in the system.

Counters 70 and 72 are initialized such that the counter 70 for the I channel begins at the start of a sine wave (or a cosine wave), and the counter 72 for the Q channel begins one count behind the I channel counter 70 to provide a 90° phase shift at the output of multiplexer 66. Table 2 below shows the corresponding multiplexer inputs selected by the various states of the counter 70 or 72 along with the multiplication factor (0, −1, or 1) of the filtered baseband signal for the sine carrier (assume I channel) and the cosine carrier (assume Q channel).

TABLE 2

| Counter Value | | Sine | Mux 60 | Cosine | Mux 66 |
|---|---|---|---|---|---|
| D1 | D0 | Value | Input | Value | Input |
| 0 | 0 | 0 | B | −1 | A |
| 0 | 1 | −1 | A | 0 | B |
| 1 | 0 | 0 | B | 1 | C |
| 1 | 1 | 1 | C | 0 | B |

Whether the I data is modulated by the sine or cosine wave is irrelevant as long as the Q data modulation is shifted by 90° from the I data modulation.

The multiplexers 60 and 66, when controlled by counters 70 and 72, effectively output a modulated sine wave and cosine wave, respectively, having a frequency of one-fourth the sampling frequency, where this modulated frequency is now equal to the carrier frequency $f_{carrier}$, and where the carrier frequency's amplitude of $\pm V_{PP}$ is modulated by the output of the ROM filters 44 and 46.

In the preferred embodiment, there is only a single 2-bit counter whose output is directly coupled to the control terminal of multiplexer 60 and whose output is delayed by one count before being applied to multiplexer 66. The delayed count may be considered a separate counter for purposes of this disclosure.

The 5-bit outputs of multiplexers 60 and 66 are added together by adder 74, which then outputs a 6-bit signal to a digital-to-analog converter 76.

Figure 5:
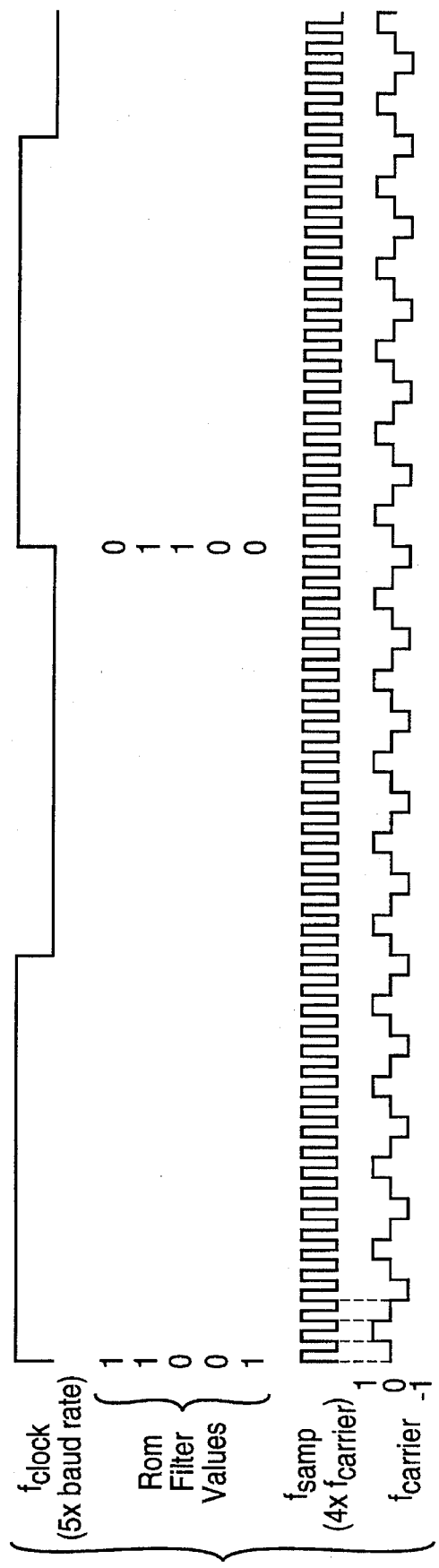
FIG. 5 is a timing diagram illustrating the operation of the preferred digital modem.

An example of the timing in the modulator of FIG. 4 is provided in FIG. 5. FIG. 5 illustrates the sample frequency $f_{samp}$, the carrier frequency $f_{carrier}$ output from multiplexer 60 or 66 for an I or Q value of 1 (or binary 11111 for a 5-bit word), and the clock frequency $f_{clock}$ for latches 48 and 50. In the example of FIG. 5, the sampling frequency $f_{samp}$ is four times that of the carrier frequency $f_{carrier}$ and 40 times that of the clock frequency $f_{clock}$. The clock frequency $f_{clock}$ is five times that of the baud rate of the I/Q symbols. In another embodiment, $f_{clock}$ is ten times that of the baud rate, or any other suitable multiple. Exemplary ROM filter 44/46 outputs are also indicated, but are not reflected in the multiplexer 60/66 output for simplicity.

In the preferred embodiment, the sample frequency $f_{samp}$ is 9.6 MHz, and the minimum number of samples of the carrier to achieve an integer number of complete carrier cycles is four. This leads to a modulated carrier frequency of 2.4 MHz. Because the counters 70 and 72 substitute for the storage of the four samples of the sine and cosine waves, the ROM filters 44 and 46 need not store any samples of the carrier frequency. This allows ROM filters 44 and 46 to be a minimum size since the ROMs only need to store the filter responses. This is in contrast to the 25 samples of sine and cosine waves (50 samples total) required to be stored in the ROMs of the prior art systems previously described.

Figure 3:
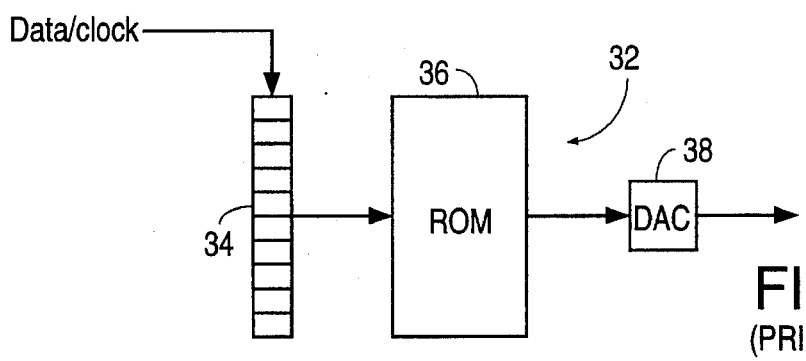
FIG. 3 is a hardware implementation of a digital QPSK modem.

Accordingly, the prior art ROMs which provided the digital sine and cosine modulated values, such as ROM 36 in FIG. 3, are now completely eliminated since the sine and cosine waves are now derived from a two-bit counter. In addition, the inventive system removes the need for large multipliers. Also, the baseband ROM filter 44/66 can run at, for example, ten times the symbol rate (i.e., 1.92 MHz), reducing the clock rate by ten times over the conventional ROM filter, which reduces current consumption.

In the preferred embodiment, the system uses one's complement numbers allowing the usage of simple inverters, as shown in FIG. 4. However, two's complement numbers may also be used.

In simulation, the measured modulation accuracy of the signal produced by the system of FIG. 4 in terms of error vector magnitude (EVM) was about 0.95%, which is consistent with ideal simulated digital modulators with five-bit output DAC quantization.

Figure 6:
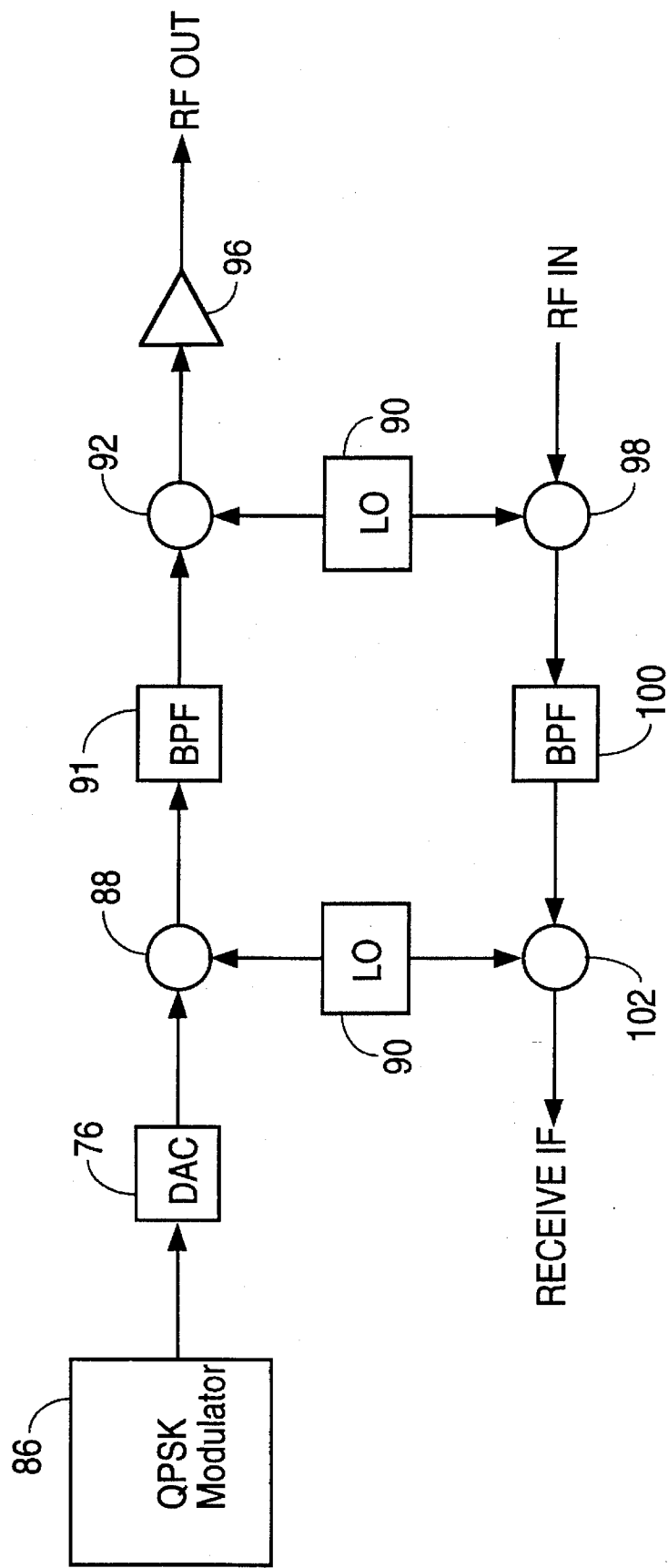
FIG. 6 is a functional diagram of the modem of FIG. 4 incorporated into a QPSK transceiver.

FIG. 6 illustrates the DQPSK modulator 86 described in FIG. 4 along with digital-to-analog converter 76 having its output up-converted to an RF signal for use in, for example, a cordless telephone. In the embodiment of FIG. 6, the analog signal output from digital-to-analog converter 76 is applied to an input of multiplier 88 which multiplies the analog signal with a local oscillator 90 frequency. The resulting signal is passed through a bandpass filter 91, which may be a SAW filter, for removing the local oscillator frequency. This filtered signal is multiplied by a second local oscillator 94 signal via multiplier 92 to provide an up-converted signal for amplification by amplifier 96 and transmission. An output frequency of the system may be on the order of 1–2 GHz.

Similar circuitry may be used for demodulating a received signal. This receiver circuitry includes multiplier 98, bandpass filter 100, and multiplier 102.

Although the preferred embodiment of FIG. 4 has been illustrated with 3-input multiplexers and 2-bit counters, it would be understood that more than four samples per carrier frequency cycle may be obtained and, thus, larger counters may be used in other embodiments with a correspondingly larger number of inputs into the multiplexers. One skilled in the art would understand how the circuit of FIG. 4 may be modified to obtain 8, 16, 32, or a greater number of samples per carrier frequency cycle.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A circuit providing phase shifted signals, said circuit comprising:

one or more first input terminals for receiving first digital data to be modulated, said first digital data having a maximum value, a minimum value, and a mid-value approximately equal to an average of said maximum value and said minimum value;

one or more inverters having inputs coupled to receive said first digital data to be modulated, said inverters outputting inverted data;

a first multiplexer having as inputs at least said inverted data, a value equal to said mid-value, and non-inverted data;

a first counter providing at least a four-state control signal to said first multiplexer for selecting as an output of said first multiplexer said inverted data, said mid-value, or said non-inverted data; and a sampling clock controlling said first counter, wherein an output of said first multiplexer provides a first modulated carrier signal having a carrier frequency of less than or equal to one-fourth that of said sampling clock.

2. The circuit of claim 1 wherein said first multiplexer is connected in an I channel of a quadrature phase shift keying (QPSK) system, and said first digital data is I data in said QPSK system, said circuit further comprising:

one or more second input terminals for receiving Q data to be modulated;

one or more inverters coupled to receive said Q data, said inverters outputting inverted Q data; and a second multiplexer having as inputs at least said inverted Q data, a value equal to a mid-value of said Q data, and non-inverted Q data;

a second counter controlled by said sampling clock, said second counter providing at least a four-state control signal to said second multiplexer for selecting as an output of said second multiplexer said inverted Q data, said mid-value of said Q data, or said non-inverted Q data, wherein an output of said second multiplexer provides a second modulated carrier signal having a carrier frequency of less than or equal to one-fourth that of said sampling clock; and an adder for adding said output from said first multiplexer and said second multiplexer.

3. The circuit of claim 2 wherein said second counter has a count which differs by one from a count in said first counter.

4. The circuit of claim 3 wherein said second counter is a count obtained from said first counter but offset by one count.

5. The circuit of claim 2 further comprising one or more digital filters for receiving an original digital signal and outputting a filtered digital signal, one or more outputs of said digital filter being connected to said one or more first input terminals and to said one or more second input terminals.

6. The circuit of claim 2 further comprising a digital-to-analog converter connected to a output of said adder.

7. The circuit of claim 2 wherein said circuit is a digital modulator for a QPSK communication system.

8. The circuit of claim 2 wherein said circuit is a digital modulator for a DQPSK communication system.

9. The circuit of claim 2 wherein said first modulated carrier signal and said second modulated carrier signal have a carrier frequency equal to one-fourth that of said sampling clock.

10. The circuit of claim 1 wherein said first modulated carrier signal has a carrier frequency equal to one-fourth that of said sampling clock.

11. The circuit of claim 1 further comprising a digital filter for receiving an original digital signal and outputting a filtered digital signal, an output of said digital filter being connected to said one or more first input terminals.

12. A method for providing phase shifted signals, said method comprising the steps of:

generating first digital data to be modulated, said first digital data having a maximum value, a minimum value, and a mid-value approximately equal to an average of said maximum value and said minimum value;

inverting said first digital data to be modulated to created inverted data;

applying said inverted data, said mid-value, and non-inverted data to inputs of a first multiplexer;

controlling said first multiplexer with a first counter providing at least a four-state control signal to said first multiplexer for selecting as an output of said first multiplexer said inverted data, said mid-value, or said non-inverted data; and clocking said first counter with a sampling clock to cause an output of said first multiplexer to provide a first modulated carrier signal having a carrier frequency of less than or equal to one-fourth that of said sampling clock.

13. The method of claim 12 wherein said first multiplexer is connected in an I channel of a quadrature phase shift keying (QPSK) system, and said first digital data is I data generated by a QPSK source, said method further comprising:

generating Q data to be modulated;

inverting said Q data to create inverted Q data;

applying said inverted Q data, a value equal to a mid-value of said Q data, and non-inverted Q data to inputs of a second multiplexer;

controlling said second multiplexer with a second counter controlled by said sampling clock, said second counter providing at least a four-state control signal to said second multiplexer for selecting as an output of said second multiplexer said inverted Q data, said mid-value of said Q data, or said non-inverted Q data, wherein an output of said second multiplexer provides a second modulated carrier signal having a carrier frequency of less than or equal to one-fourth that of said sampling clock; and adding said output from said first multiplexer and said second multiplexer.

14. The method of claim 13 wherein said second counter has a count which differs by one from a count in said first counter.

15. The method of claim 14 wherein said second counter is a count obtained from said first counter but offset by one count.

16. The method of claim 13 further comprising the step of digitally filtering original data signals and outputting from a digital filter said I data and said Q data.

17. The method of claim 13 further comprising the step of converting added outputs of said first multiplexer and said second multiplexer to an analog signal.

18. The method of claim 13 wherein said I data and said Q data are generated by a DQPSK source.

19. The method of claim 13 wherein said first modulated carrier signal and said second modulated carrier signal have a carrier frequency equal to one-fourth that of said sampling clock.

20. The method of claim 12 wherein said first modulated carrier signal has a carrier frequency equal to one-fourth that of said sampling clock.

* * * * *